US012560501B2

(12) United States Patent
Woelke

(10) Patent No.: US 12,560,501 B2
(45) Date of Patent: Feb. 24, 2026

(54) PRESSURE SENSOR HAVING AN ANTISTATIC SURFACE, AND METHOD OF MANUFACTURE

(71) Applicant: Robert Bosch GmbH, Stuttgart (DE)

(72) Inventor: Florian Woelke, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 187 days.

(21) Appl. No.: 17/812,221

(22) Filed: Jul. 13, 2022

(65) Prior Publication Data

US 2023/0021268 A1      Jan. 19, 2023

(30) Foreign Application Priority Data

Jul. 19, 2021      (DE) ..................... 10 2021 207 675.0

(51) Int. Cl.
*G01L 19/14*          (2006.01)
*G01L 19/06*          (2006.01)
(52) U.S. Cl.
CPC .................................. *G01L 19/14* (2013.01)
(58) Field of Classification Search
CPC ..... G01L 19/142; G01L 23/10; G01L 19/141; G01L 9/0054; G01L 13/025; G01L 9/0055; G01L 19/143; G01L 19/0654; G01L 19/0046; G01L 19/0092; G01L 19/0645; G01L 9/0073; G01L 9/0042; G01L 9/007; G01L 19/0038; G01N 15/0606; G01N 27/4067; G01D 11/30; B81C 1/00285; H01L 21/76898

USPC ........................................................... 73/756
See application file for complete search history.

(56) References Cited

U.S. PATENT DOCUMENTS

| | | | | |
|---|---|---|---|---|
| 4,732,042 | A * | 3/1988 | Adams .................. | G01L 19/147 |
| | | | | 338/42 |
| 2002/0191331 | A1* | 12/2002 | Nonaka ................... | B32B 27/18 |
| | | | | 360/99.19 |
| 2006/0257672 | A1 | 11/2006 | Horikoshi et al. | |
| 2007/0279845 | A1* | 12/2007 | Kuhnt ................. | G01L 19/0645 |
| | | | | 361/679.01 |

FOREIGN PATENT DOCUMENTS

| | | |
|---|---|---|
| CN | 103881387 A | 6/2014 |
| CN | 109233737 A | 1/2019 |
| DE | 102004033475 A1 | 8/2005 |
| JP | 2010147227 A | 7/2010 |

* cited by examiner

*Primary Examiner* — Brandi N Hopkins
(74) *Attorney, Agent, or Firm* — NORTON ROSE FULBRIGHT US LLP

(57) ABSTRACT

A pressure sensor having an anti-adhesion layer, and a method for manufacturing such a pressure sensor. In this context, the pressure sensor includes a pressure sensor element, which is accommodated and/or situated in a housing of the pressure sensor. In order to protect the pressure sensor element, at least one filling material is provided, which is introduced into the housing and covers the pressure sensor element at least partially. The surface of the at least one filling material is configured to have an antistatic effect.

10 Claims, 1 Drawing Sheet

PRESSURE SENSOR HAVING AN ANTISTATIC SURFACE, AND METHOD OF MANUFACTURE

CROSS REFERENCE

The present application claims the benefit under 35 U.S.C. § 119 of German Patent Application No. DE 10 2021 207 675.0 filed on Jul. 19, 2021, which is expressly incorporated herein by reference in its entirety.

FIELD

The present invention relates to a pressure sensor having an antistatic surface, as well as to a method for manufacturing such a pressure sensor.

BACKGROUND INFORMATION

Micromechanical pressure sensors include pressure sensor elements, which generate a pressure-dependent sensor signal as a function of a pressure of an applied medium. Since the sensing element or the utilized contacting areas of the pressure sensor element may be corroded or contaminated by the applied medium, the pressure sensor element is usually covered at least partially by a passivating material. To this end, the pressure sensor element is accommodated in a housing, and the passivating material is introduced into the housing as filling material. In this context, the passivating material has additionally the task of transmitting the applied pressure to the pressure sensor element, in particular, without producing damping or a time delay.

During the use of such a construction, contaminants or, in general, particles, may deposit on the surface of the passivating material; the contaminants or particles penetrating the passivating material and corroding the contacting areas. In order to prevent penetration, fillers, as are described in German Patent Application No. DE 10 2004 033 475 A1, may be used. In addition, the particles adhering to the surface of the passivating material may affect the freedom of motion and the transmission of pressure changes to the passivating material and, therefore, to the pressure sensor element. In order to prevent the passivating material from coming into contact with harmful components of the medium, or to prevent particles from adhering, the use of an additional material layer in the form of a Teflon membrane is described in German Patent Application No. DE 10 2004 033 475 A1.

SUMMARY

A pressure sensor having an anti-adhesion layer, as well as a method for manufacturing such a pressure sensor, are provided by the present invention. In this context, the pressure sensor includes a pressure sensor element, which is accommodated and/or situated in a housing of the pressure sensor. In accordance with an example embodiment of the present invention, in order to protect the pressure sensor element, at least one filling material is provided, for example, a passivating gel such as Sifel 8070, SEM 917, SEM 942, SEM 944, SilGel 612, which is introduced into the housing and covers the pressure sensor element at least partially. In this context, in accordance with the present invention, the surface of the at least one filling material is configured to have an antistatic effect.

An advantage of such a refinement is that the contamination of the surface is reduced, since, in particular, ionically charged particles are no longer attracted. In addition, such an antistatic surface may also prevent discharge sparks from forming or being able to penetrate the filling material, which means that the electronic components of the pressure sensor element are protected. By reducing the deposition of particles, the service life of the pressure sensor is also extended, since any necessary compensating operations for adapting to the coverage of the sensor surface have to be carried out at greater intervals.

In one particular example embodiment of the present invention, at least one of the filling materials used is enriched or mixed with antistatic particles or components. In this context, the introduction and/or enrichment may take place both prior to the filling of the housing and in the filled state. In this connection, polyquaternium should be mentioned as a possible component, which may be introduced into the filling material. The introduction takes place in the form of a microplastic. Due to the cationic properties of polyquaternium, the surface of the filling material is positively charged.

In addition, the surface of the filling material may take the form of an ionic tenside anti-adhesion layer.

A further refinement of the present invention uses at least two filling materials. In this context, a first filling material is deposited directly onto the pressure sensor element. In this context, the second filling material is deposited onto the surface of the first filling material in the form of a membrane. In this connection, both the entire surface and only a portion of the surface may be covered by the second filling material, for example, by the ionic tenside anti-adhesion layer. As an option, only the first or only the second filling material may include the antistatic elements, particles or components.

Further advantages are derived from the following description of exemplary embodiments, and from the figures.

DETAILED DESCRIPTION OF EXAMPLE EMBODIMENTS

Figure 1:
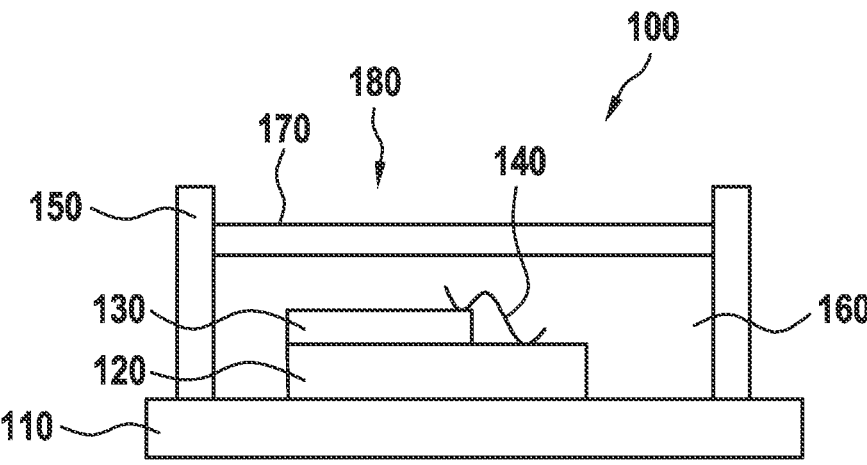
FIG. 1 shows an example pressure sensor represented schematically.

The construction of a pressure sensor 100 manufactured with the aid of micromechanical methods is described, using FIG. 1; the present invention being intended to be explained in light of the construction of the pressure sensor. In this connection, a housing 150 is positioned on a substrate 110, such as a circuit board. An evaluation chip 120 and a pressure sensor element 130, which are interconnected electrically by a bond 140, are positioned in housing 150, that is, on substrate 110. Also, as an alternative, only pressure sensor element 130 may be positioned on substrate 110; or evaluation chip 120, for example, an ASIC, may be positioned on substrate 110 next to pressure sensor element 130. A first filling material 160, which covers at least the important electrical and/or electronic components of pressure sensor element 130 and, optionally, of evaluation chip 120, is introduced into housing 150, in order to prevent corrosion of the medium surrounding pressure sensor 100, due to pollutants.

In a first embodiment of the present invention, first filling material 160 includes antistatic particles or components, which prevent, in particular, charged particles from depositing or settling on its surface facing the medium to be measured.

In one alternative, second variant of the present invention, a layer of a second filling material 170 is provided on first filling material 160. In this context, this layer may cover first filling material 160 completely or only partially. This layer advantageously takes the form of a planar membrane. The antistatic effect of the surface of second filling material 170 is achieved by the use of ionic tensides, such as quaternary ammonium compounds having at least one long alkyl group.

As an option, only one of the two filling materials 160 and 170 may include antistatic elements. However, in addition, an antistatic effect with respect to the applied medium may first be generated upon the interaction of the two filling materials 160 and 170.

Figure 2:
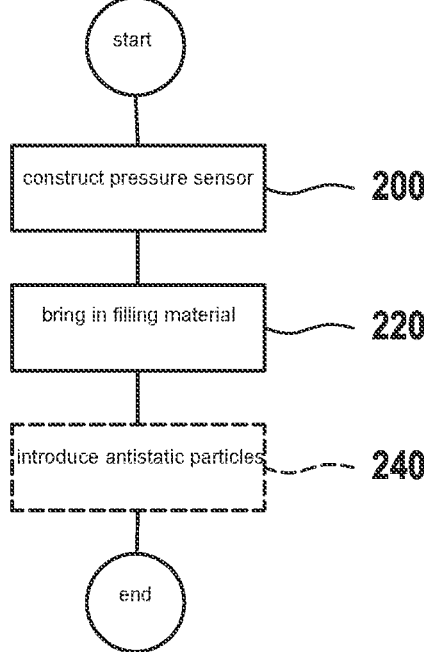
FIG. 2 shows a flow chart for an example method of manufacturing the pressure sensor of the present invention.

The manufacture of the pressure sensor 100 according to the present invention is described in light of the flow chart of FIG. 2. In a first version of the manufacturing, after the construction of the pressure sensor by micromechanical method steps in step 200, the first filling material 160 mixed with antistatic particles, components, or elements is brought into housing 150 and cured in the next step 220.

In an alternative method, in step 220, a filling material 160 is used, which does not yet have any antistatically acting parts. The antistatic particles or components are first introduced into first filling material 160, using an additional step 240.

In a further possible method, in step 220, a layer made of a second filling material 170 may be deposited after the introduction of first filling material 160. In this context, both the first and/or the second filling material 160, 170, respectively, may be provided with antistatic particles or components. As explained above, these antistatic particles or components may be introduced both prior to and after the introduction of the respective filling material.

In this context, the antistatic particles, elements or components may constitute a fraction of 0.1 to 30% of the filling material, for example, as an admixture or as a subsequent result of implantation. In one particular variant, the fraction may also be 0.5 to 5%.

In the layer made up of the second filling material, the fraction of antistatic particles, elements, or components may be between 50 and 99%. In this context, the layer may be, in particular, very thin, for example, between 100 nm and 4 µm. If the layer covers the underlying passivating gel, that is, the first filling material, completely, then sufficient flexibility of the structure made up of the two filling materials may be obtained, which means that the applied pressure may be transmitted without considerable damping or delay.

A possible method of depositing the layer of second filling material 170 is to use a spraying operation.

What is claimed is:

1. A pressure sensor, comprising:
   a housing; and
   a pressure sensor element situated in the housing, the pressure sensor element in the housing being covered at least partially by at least one filling material, the at least one filling material transmitting a pressure of an applied medium to the pressure sensor element;
   wherein the at least one filling material is a passivating gel,
   wherein a surface of the filling material, which is pointed at the applied medium, has an antistatic property,
   wherein the antistatic property of the surface of the filling material results from an interaction between a first filling material and a second filling material deposited at least partially on the first filling material.

2. The pressure sensor as recited in claim 1, wherein the filling material is enriched with antistatic particles.

3. The pressure sensor as recited in claim 2, wherein the antistatic particles include polyquaternium.

4. The pressure sensor as recited in claim 1, wherein at least part of the surface of the filling material has an ionic tenside anti-adhesion layer.

5. The pressure sensor as recited in claim 1, wherein the pressure sensor element is covered by the first filling material, and a layer including the second filling material, is deposited at least partially on the first filling material, the second filling material including an ionic tenside anti-adhesion layer.

6. A method for manufacturing a pressure sensor, comprising:
   positioning a pressure sensor element in a housing; and
   introducing at least one filling material into the housing, the at least one filling material covering the pressure sensor element at least partially;
   wherein the at least one filling material is a passivating gel,
   wherein antistatic components are introduced into the at least one filling material,
   wherein the antistatic property of the surface of the filling material results from an interaction between a first filling material and a second filling material deposited at least partially on the first filling material.

7. The method as recited in claim 6, wherein the antistatic components are introduced into the at least one filling material prior to the introduction of the filling material into the housing.

8. The method as recited in claim 6, wherein the filling material is enriched with polyquaternium.

9. The method as recited in claim 6, wherein the second filling material, contains the antistatic components.

10. The method as recited in claim 9, wherein the second filling material includes an ionic tenside anti-adhesion layer.

* * * * *